P. GORTON.
CULTIVATOR ATTACHMENT.
APPLICATION FILED AUG. 26, 1918.
1,301,555.
Patented Apr. 22, 1919.
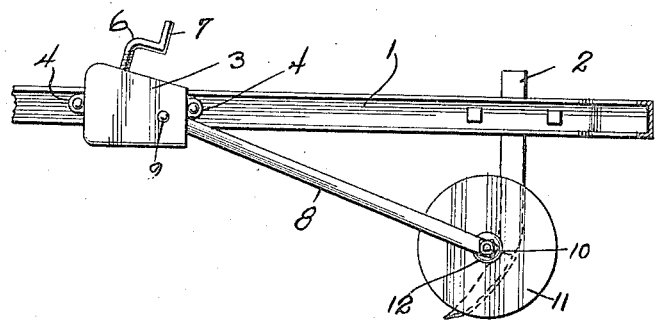
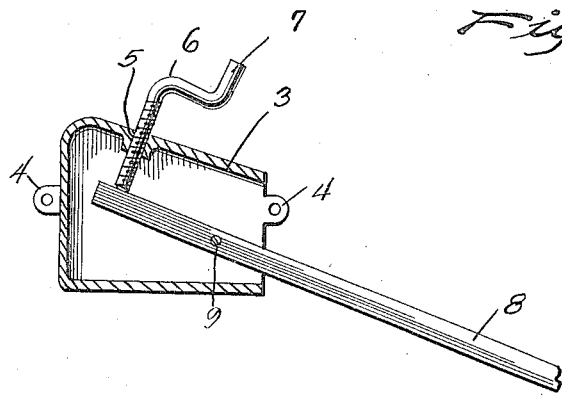
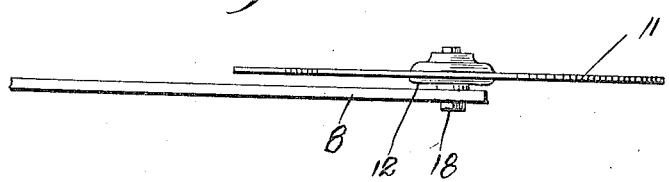
WITNESSES
Inventor
Paul Gorton
By Richard Blewer
Attorney

UNITED STATES PATENT OFFICE.

PAUL GORTON, OF REMUS, MICHIGAN.

CULTIVATOR ATTACHMENT.

1,301,555.

Specification of Letters Patent.    Patented Apr. 22, 1919.

Application filed August 26, 1918.    Serial No. 251,477.

*To all whom it may concern:*

Be it known that I, PAUL GORTON, a citizen of the United States, residing at Remus, in the county of Mecosta and State of Michigan, have invented certain new and useful Improvements in Cultivator Attachments, of which the following is a specification.

This invention relates to cultivator attachments and more particularly to a device to be used on a tooth cultivator for shielding the planted seeds whereby they will not be covered by sod or refuse thrown aside by the teeth of the cultivator.

The primary object of the invention is to provide a rotary shield attached to the cultivator frame so that the shield will be held against the outside tooth of the cultivator and be adapted to run between the outermost tooth and the adjacent row of corn, so that the corn will not be covered by the material displaced by the tooth.

The invention further aims to provide a rotary shield so that the shield will readily turn and ride over sticks, stones, and other material which would otherwise be dragged along by the shield if the same were stationary.

A further object of the invention is to provide an adjustable rotary shield adapted to be raised and lowered by the operator of the cultivator from a point above the cultivator frame so that the shield may be held at the desired height and will, by its own weight, drop to the desired lower position when properly adjusted.

A further object of the invention is to provide a rotary shield which will be perfectly flat in the form of a circular plate or disk adapted to run very close to the cultivator frame and engage the outermost tooth of the cultivator if desired.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a side elevation of the device constructed in accordance with my invention.

Fig. 2 is an enlarged view of the adjusting mechanism for the shield.

Fig. 3 is a top plan view of the shield attached to the extension bar, and showing its relatively thin and flat construction.

Referring to the drawings, wherein is illustrated the preferred form of my invention, in which like characters of reference indicate like or corresponding parts throughout the several views, the cultivator frame 1 is provided in the usual manner with a plurality of teeth, one of which is indicated at 2. The teeth, as shown are curved in the usual manner and have their points adapted to engage the ground surface.

Mounted upon the side bar of the frame is a boxing 3 which is provided with ears 4 adapted to receive bolts or rivets whereby the boxing may be attached to the frame bar of the cultivator. The top of the boxing is provided with a screw threaded opening 5 through which one end of a crank 6 is extended. This end is screw threaded whereby it may be longitudinally adjusted through the top of the boxing and the opposite end of the crank forms a handle 7 to permit the operator to readily make the adjustment. One end of the boxing, as shown in Fig. 2 of the drawing is open and an extension bar 8 is extended through the open end and has pivotal connection with the boxing on the interior thereof through the medium of a pivot pin 9. This causes the inner end of the extension bar 8 to be received beneath one end of the screw threaded end of the crank 6 whereby the end may be raised and lowered in the boxing when the crank is operated.

The opposite end of the bar 8 is provided with a supporting pin 10 upon which is mounted the circular shield 11 which is in the form of a flat disk having a relatively thin hub 12 whereby the disk is disposed close to the bar 8 as shown to advantage in Fig. 3.

This bar is of a length to cause the center of the shield to be adjacent the curved end of the cultivator tooth as shown in Fig. 1 whereby the shield operates adjacent the tooth and may be actually in engagement with the side thereof if desired for causing a line to be drawn at the edge of the cultivator when the cultivator is in operation and prevent the throwing of earth, stones, or sticks to one side of the cultivator when the same is in operation. In this manner all refuse or objectionable material is held in a certain path and will not cover the corn or other seeds which would be destroyed by any refuse covering them to any great depth.

The foregoing description and accompanying drawing have reference to what might be considered to be the preferred or approved form of my invention. I desire it to be understood that I may make such changes in the construction, combination and arrangement of parts, materials, dimensions et cetera, as may prove expedient and fall within the scope of the appended claims.

Having thus fully described my invention what I claim as new and desire to secure by Letters Patent, is:—

1. A cultivator attachment comprising a cultivator frame, a boxing mounted upon the frame, a bar pivotally mounted in the boxing and carrying a shield element at one end, the opposite end being arranged to swing in the boxing, a crank provided with a screw threaded shank having one end extended into the boxing and engaged with the said end of the bar for adjusting the bar within the boxing to raise and lower the shield element.

2. A cultivator attachment comprising a cultivator frame, a boxing having an open end provided with means for attaching the boxing to the said frame, the top of the boxing being provided with a screw threaded opening, an adjustable crank extended through the opening and having a handle to adjust the crank, the extension bar having one end extended into the boxing and engaged with the said extended end of the screw threaded shank, the said extension bar being pivotally mounted within the boxing and provided at its opposite end with a shield element adapted to be raised and lowered when the said opposite end of the extension bar is swung within the boxing.

3. A combination with a cultivator frame having teeth depending therefrom, of a flat disk disposed beneath the cultivator frame and having one side adapted to engage the endmost tooth, an extension bar provided at one end with a pin passed through the center of the said disk to connect the latter to the said bar, a supporting element mounted on the cultivator frame and adapted to receive the said extension bar to pivotally connect the same to the said frame, and an adjusting means mounted to engage the end of the said extension bar for actuating the latter to raise and lower the said disk.

In testimony whereof I affix my signature in presence of two witnesses.

PAUL GORTON.

Witnesses:
ORA HEWLETT,
HATTIE GORTON.

Copies of this patent may be obtained for five cents each, by addressing the "Commissioner of Patents, Washington, D. C."